(12) United States Patent
Kita

(10) Patent No.: US 12,255,784 B2
(45) Date of Patent: Mar. 18, 2025

(54) CONTROLLING START TIMING OF NETWORK LOAD PREDICTION

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/262,012

(22) PCT Filed: Jul. 29, 2022

(86) PCT No.: PCT/JP2022/029357
§ 371 (c)(1),
(2) Date: Jul. 19, 2023

(87) PCT Pub. No.: WO2024/024107
PCT Pub. Date: Feb. 1, 2024

(65) Prior Publication Data
US 2024/0396807 A1 Nov. 28, 2024

(51) Int. Cl.
*H04L 41/147* (2022.01)
*H04L 43/0876* (2022.01)

(52) U.S. Cl.
CPC ........ *H04L 41/147* (2013.01); *H04L 43/0876* (2013.01)

(58) Field of Classification Search
CPC .......................... H04L 41/147; H04L 43/0876
See application file for complete search history.

(56) References Cited

U.S. PATENT DOCUMENTS

2014/0289397 A1 9/2014 Dewagamage et al.
2015/0222515 A1 8/2015 Mimura et al.
(Continued)

FOREIGN PATENT DOCUMENTS

JP 2012142672 A 7/2012
JP 2014183495 A 9/2014
(Continued)

OTHER PUBLICATIONS

International Search Report in PCT Application No. PCT/JP2022/029356, mailed Oct. 11, 2022, 3pp.

*Primary Examiner* — June Sison
(74) *Attorney, Agent, or Firm* — HAUPTMAN HAM, LLP

(57) ABSTRACT

It is enabled that network load prediction for executing scale-out of an element included in a communication system is started at an appropriate timing. A policy manager (90) determines whether network load prediction is required based on performance index value data and a determination criterion which is based on a usage amount of computer resources. An AI (70) starts network load prediction in response to a determination that the network load prediction is required. After the network load prediction is started, the policy manager (90) determines whether scale-out is required based on a network load prediction result. The policy manager (90), a life cycle manager (94), a container manager (78), and a configuration manager (76) execute scale-out of the element included in the communication system in response to a determination that the scale-out is required.

8 Claims, 12 Drawing Sheets

(56) References Cited

U.S. PATENT DOCUMENTS

| | | | |
|---|---|---|---|
| 2015/0289149 A1* | 10/2015 | Ouyang | H04W 16/18 |
| | | | 370/252 |
| 2017/0118088 A1 | 4/2017 | Koizumi | |
| 2017/0339024 A1* | 11/2017 | Bhide | G06F 16/26 |
| 2017/0353361 A1* | 12/2017 | Chopra | H04L 41/0897 |

FOREIGN PATENT DOCUMENTS

| | | | |
|---|---|---|---|
| JP | 2015149578 A | 8/2015 | |
| JP | 2016220126 A | 12/2016 | |
| JP | 2018191217 A | 11/2018 | |
| WO | 2015194182 A1 | 12/2015 | |

\* cited by examiner

CONTROLLING START TIMING OF NETWORK LOAD PREDICTION

RELATED APPLICATIONS

The present application is a National Phase of International Application Number PCT/JP2022/029357, filed Jul. 29, 2022.

TECHNICAL FIELD

The present invention relates to controlling a start timing of network load prediction.

BACKGROUND ART

In Patent Literature 1, there is described a system in which a usage bandwidth of each network process function of a communication device is acquired, and the number of network software executors to be used for network processes is increased when the bandwidth is greater than a scale-out threshold value.

CITATION LIST

Patent Literature

[Patent Literature 1] JP 2016-220126 A

SUMMARY OF INVENTION

Technical Problem

In order to scale out elements included in a communication system as described in Patent Literature 1 in a timely manner, it is conceivable to execute scale-out based on a network load prediction result.

However, it is undesirable to constantly predict the network load for all elements included in the communication system because such prediction is a wasteful use of computer resource capacity and wasteful consumption of power. In particular, in a situation in which there are no spare computer resources, it is desired that prediction be executed at the minimum level that is required.

The present invention has been made in view of the above-mentioned circumstances, and has an object to enable network load prediction for executing scale-out of an element included in a communication system to be started at an appropriate timing.

Solution to Problem

In order to solve the above-mentioned problem, according to one embodiment of the present disclosure, there is provided a scale-out execution system including: performance index value data acquisition means for acquiring performance index value data indicating an actual result value of a performance index value relating to a communication system; determination criterion determination means for determining, based on a usage amount of computer resources, a determination criterion relating to whether network load prediction is required; first determination means for determining, based on the performance index value data and the determination criterion, whether network load prediction is required; prediction start means for starting network load prediction in response to a determination that the network load prediction is required; second determination means for determining, after the network load prediction is started, whether scale-out is required based on a network load prediction result; and scale-out execution means for executing scale-out of an element included in the communication system in response to a determination that the scale-out is required.

Further, according to one embodiment of the present disclosure, there is provided a scale-out execution method including: acquiring performance index value data indicating an actual result value of a performance index value relating to a communication system; determining, based on a usage amount of computer resources, a determination criterion relating to whether network load prediction is required; determining, based on the performance index value data and the determination criterion, whether network load prediction is required; starting network load prediction in response to a determination that the network load prediction is required; determining, after the network load prediction is started, whether scale-out is required based on a network load prediction result; and executing scale-out of an element included in the communication system in response to a determination that the scale-out is required.

DESCRIPTION OF EMBODIMENTS

One embodiment of the present invention is now described in detail with reference to the drawings.

Figure 1:
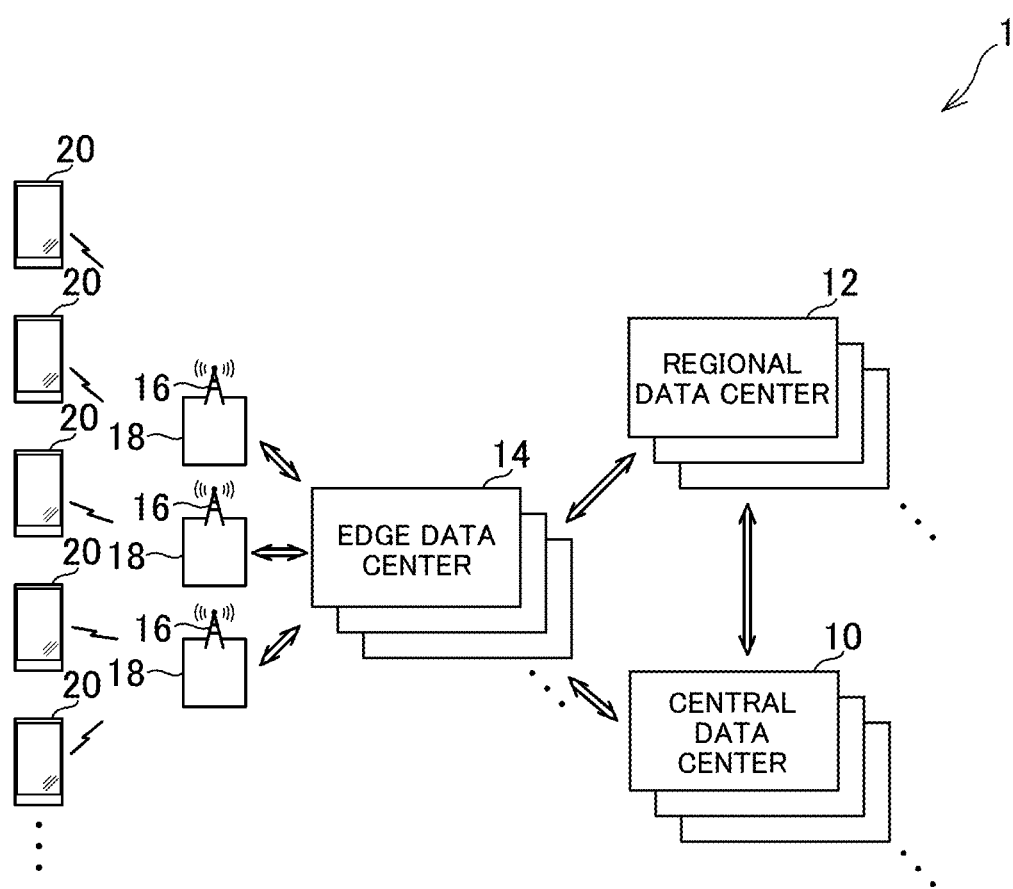
FIG. 1 is a diagram for illustrating an example of a communication system in one embodiment of the present invention.
Figure 2:
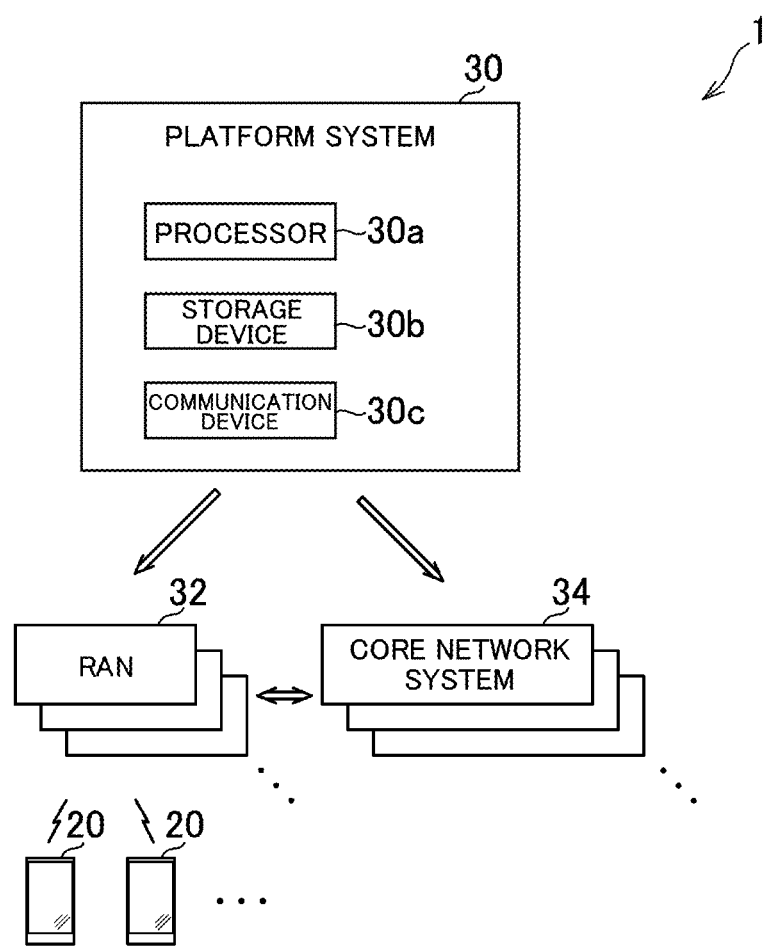
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate with a communication facility 18 provided with an antenna 16. In this case, as illustrated in FIG. 1, one edge data center 14 may be capable of communicating with several communication facilities 18. The communication facility 18 may include a computer such as a server computer. The communication facility 18 in this embodiment performs radio communication with a user equipment (UE) 20 via the antenna 16. The communication facility 18 provided with the antenna 16 is provided with, for example, a radio unit (RU), which is described later.

A plurality of servers are arranged in each of the central data centers 10, the regional data centers 12, and the edge data centers 14 in this embodiment.

In this embodiment, for example, the central data centers 10, the regional data centers 12, and the edge data centers 14 can communicate with one another. Communication can also be performed between the central data centers 10, between the regional data centers 12, and between the edge data centers 14. As illustrated in FIG. 2, the communication system 1 in this embodiment includes a platform system 30, a plurality of radio access networks (RANs) 32, a plurality of core network systems 34, and a plurality of UEs 20. The core network system 34, the RAN 32, and the UE 20 cooperate with each other to implement a mobile communication network.

The RAN 32 is a computer system, which is provided with the antenna 16, and corresponds to an eNodeB (eNB) in a fourth generation mobile communication system (hereinafter referred to as "4G") and an NR base station (gNB) in a fifth generation mobile communication system (hereinafter referred to as "5G"). The RANs 32 in this embodiment are implemented mainly by server groups arranged in the edge data centers 14 and the communication facilities 18. A part of the RAN 32 (for example, distributed unit (DU) or central unit (CU) or virtual distributed unit (vDU) or virtual central unit (vCU)) may be implemented by the central data center 10 or the regional data center 12 instead of the edge data center 14.

The core network system 34 is a system corresponding to an evolved packet core (EPC) in 4G or a 5G core (5GC) in 5G. The core network systems 34 in this embodiment are implemented mainly by server groups arranged in the central data centers 10 or the regional data centers 12.

The platform system 30 in this embodiment is configured, for example, on a cloud platform and includes a processor 30a, a storage device 30b, and a communication device 30c, as illustrated in FIG. 2. The processor 30a is a program control device such as a microprocessor which operates in accordance with a program installed in the platform system 30. The storage device 30b is, for example, a storage element such as a ROM or RAM, a solid state drive (SSD), a hard disk drive (HDD), or the like. The storage device 30b stores a program to be executed by the processor 30a, and the like. The communication device 30c is, for example, a communication interface such as a network interface controller (NIC) or a wireless local area network (LAN) module. Software-defined networking (SDN) may be implemented in the communication device 30c. The communication device 30c exchanges data with the RAN 32 and the core network system 34.

In this embodiment, the platform system 30 is implemented by a server group arranged in the central data center 10. The platform system 30 may be implemented by a server group arranged in the regional data center 12.

In this embodiment, for example, in response to a purchase request for a network service (NS) by a purchaser, the network service for which the purchase request has been made is constructed in the RAN 32 or the core network system 34. Then, the constructed network service is provided to the purchaser.

For example, a network service, such as a voice communication service, a data communication service, or the like, is provided to the purchaser who is a mobile virtual network operator (MVNO). The voice communication service or the data communication service provided in this embodiment is eventually provided to a customer (end user) for the purchaser (MVNO in the above-mentioned example), who uses the UE 20 illustrated in FIG. 1 and FIG. 2. The end user can perform voice communication or data communication with other users via the RAN 32 or the core network system 34. The UE 20 of the end user can also access a data network such as the Internet via the RAN 32 or the core network system 34.

In addition, in this embodiment, an Internet of things (IoT) service may be provided to an end user who uses a robot arm, a connected car, or the like. In this case, an end user who uses, for example, a robot arm, a connected car, or the like may be a purchaser of the network service in this embodiment.

In this embodiment, a container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

The network service provided to the purchaser in this embodiment is formed of one or a plurality of functional units (for example, network function (NF)). In this embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or a plurality of CNFs. The functional unit in this embodiment may also correspond to a network node.

Figure 3:
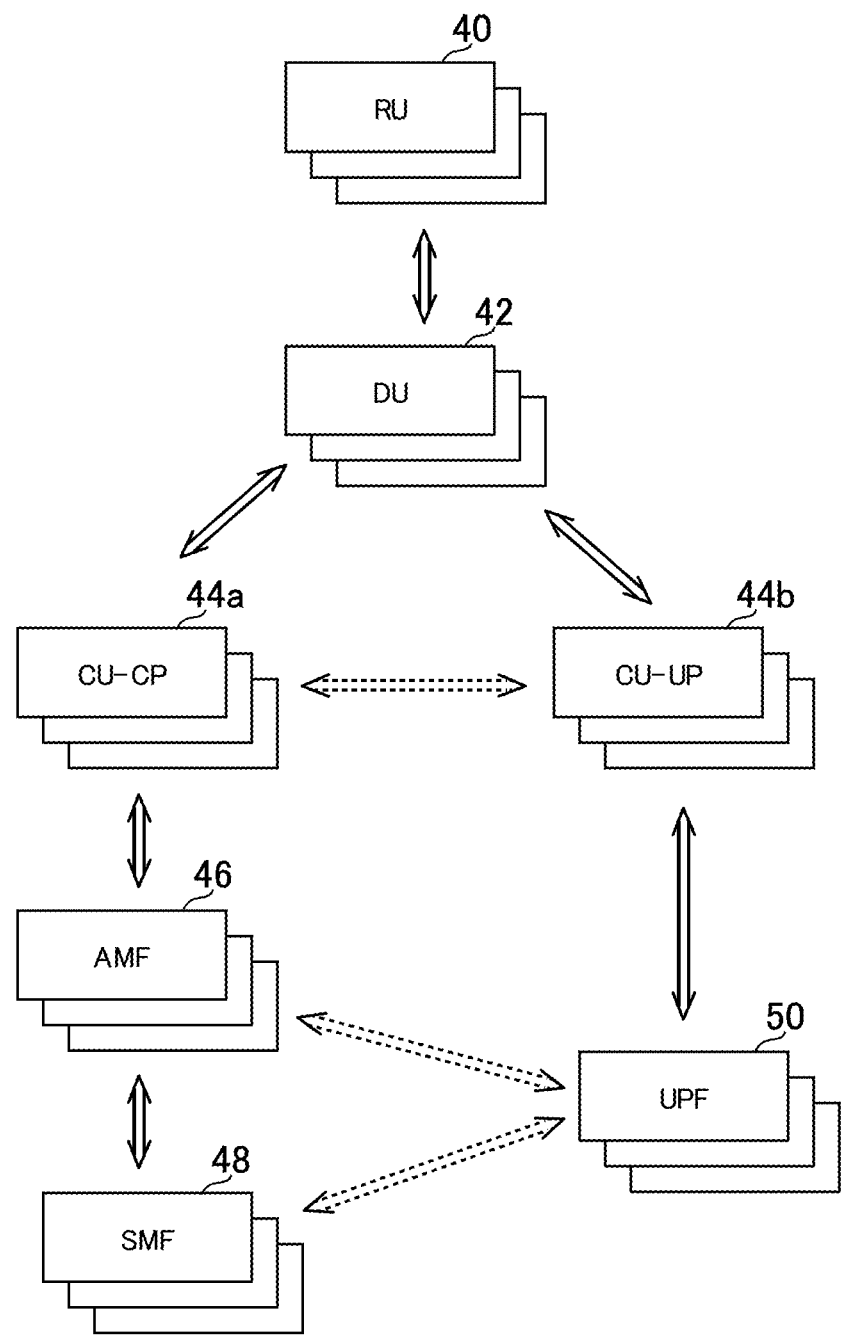
FIG. 3 is a diagram for schematically illustrating an example of a network service in the one embodiment of the present invention.

FIG. 3 is a diagram for schematically illustrating an example of an operating network service. The network service illustrated in FIG. 3 includes NFs, such as a plurality of RUs 40, a plurality of DUs 42, a plurality of CUs 44 (central unit-control planes (CU-CPs) 44a and central unit-user planes (CU-UPs) 44b), a plurality of access and mobility management functions (AMFs) 46, a plurality of session management functions (SMFs) 48, and a plurality of user plane functions (UPFs) 50, as software elements.

In the example of FIG. 3, the RUs 40, the DUs 42, the CU-CPs 44a, the AMFs 46, and the SMFs 48 correspond to elements of the control plane (C-plane), and the RUs 40, the DUs 42, the CU-UPs 44b, and the UPFs 50 correspond to elements of the user plane (U-plane).

The network service may include other types of NFs as software elements. In addition, the network service is implemented on a plurality of servers or other computer resources (hardware elements).

In this embodiment, for example, the network service illustrated in FIG. 3 provides a communication service in a certain area.

In this embodiment, it is also assumed that the plurality of RUs 40, the plurality of DUs 42, the plurality of CU-UPs 44b, and the plurality of UPFs 50, which are illustrated in FIG. 3, belong to one end-to-end network slice.

Figure 4:
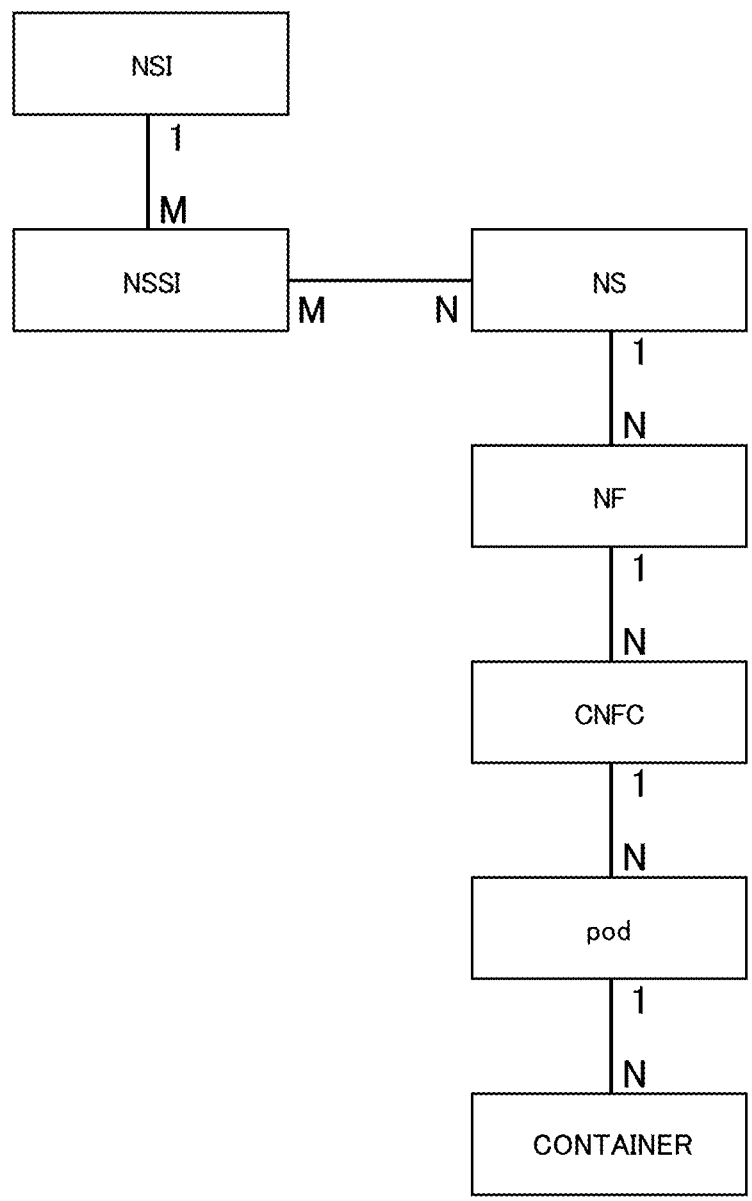
FIG. 4 is a diagram for illustrating an example of links between elements constructed in the communication system in the one embodiment of the present invention.

FIG. 4 is a diagram for schematically illustrating an example of links between elements constructed in the communication system 1 in this embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship. As illustrated in FIG. 4, a network service (NS), a network function (NF), a containerized network function component (CNFC), a pod, and a container have a hierarchical structure.

The NS corresponds to, for example, a network service formed of a plurality of NFs. In this case, the NS may correspond to an element having a granularity, such as a 5GC, an EPC, a 5G RAN (gNB), or a 4G RAN (eNB).

In 5G, the NF corresponds to an element having a granularity, such as the RU, the DU, the CU-UP, the AMF, the SMF, or the UPF. In 4G, the NF corresponds to an element having a granularity, such as a mobility management entity (MME), a home subscriber server (HSS), a serving gateway (S-GW), a vDU, or a vCU. In this embodiment, for example, one NS includes one or a plurality of NFs. That is, one or a plurality of NFs are under the control of one NS.

The CNFC corresponds to an element having a granularity, such as DU mgmt or DU processing. The CNFC may be a microservice deployed on a server as one or more containers. For example, some CNFCs may be microservices that provide a part of the functions of the DU, the CU-CP, the CU-UP, and the like. Some CNFCs may be microservices that provide a part of the functions of the UPF, the AMF, the SMF, and the like. In this embodiment, for example, one NF includes one or a plurality of CNFCs. That is, one or a plurality of CNFCs are under the control of one NF.

The pod refers to, for example, the minimum unit for managing a Docker container by Kubernetes. In this embodiment, for example, one CNFC includes one or a plurality of pods. That is, one or a plurality of pods are under the control of one CNFC.

In this embodiment, for example, one pod includes one or a plurality of containers. That is, one or a plurality of containers are under the control of one pod.

In addition, as illustrated in FIG. 4, a network slice (NSI) and a network slice subnet instance (NSSI) have a hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a transport domain such as a mobile back haul (MBH) domain, or a slice of a core network domain.

In this embodiment, for example, one NSI includes one or a plurality of NSSIs. That is, one or a plurality of NSSIs are under the control of one NSI. In this embodiment, a plurality of NSIs may share the same NSSI.

In addition, as illustrated in FIG. 4, the NSSI and the NS generally have a many-to-many relationship.

In addition, in this embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. In this case, the S-NSSAI is information associated with the network slice. The NF is not required to belong to the network slice.

Figure 5:
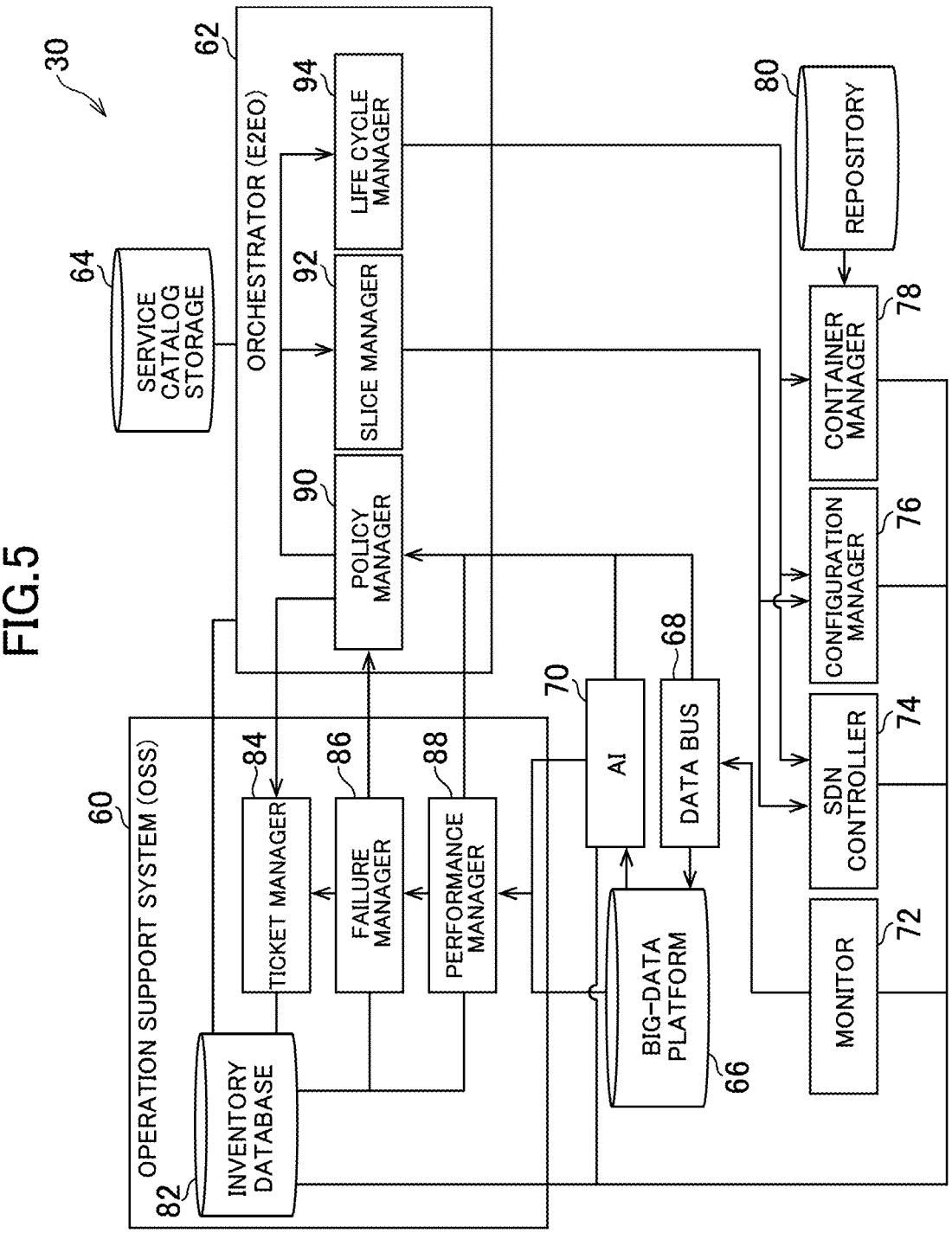
FIG. 5 is a functional block diagram for illustrating an example of functions implemented by a platform system in the one embodiment of the present invention.

FIG. 5 is a functional block diagram for illustrating an example of functions implemented by the platform system 30 in this embodiment. The platform system 30 in this embodiment is not required to implement all the functions illustrated in FIG. 5, and may implement functions other than those illustrated in FIG. 5.

As illustrated in FIG. 5, the platform system 30 in this embodiment functionally includes, for example, an operation support system 60, an (OSS) orchestrator (end-to-end-orchestrator (E2EO)) 62, a service catalog storage 64, a big-data platform 66, a data bus 68, an artificial intelligence (AI) 70, a monitor 72, an SDN controller 74, a configuration manager 76, a container manager 78, and a repository 80. The OSS 60 includes an inventory database 82, a ticket manager 84, a failure manager 86, and a performance manager 88. The E2EO 62 includes a policy manager 90, a slice manager 92, and a life cycle manager 94. Those elements are implemented mainly by the processor 30a, the storage device 30b and the communication device 30c.

The functions illustrated in FIG. 5 may be implemented by executing, by the processor 30a, a program that is installed in the platform system 30, which is one or a plurality of computers, and that includes instructions corresponding to the functions. This program may be supplied to the platform system 30 via a computer-readable information storage medium, such as an optical disc, a magnetic disk, a magnetic tape, a magneto-optical disc, a flash memory, or the like, or via the Internet or the like. The functions illustrated in FIG. 5 may also be implemented by a circuit block, a memory, and other LSIs. Further, a person skilled in the art would understand that the functions illustrated in FIG. 5 can be implemented in various forms by only hardware, by only software, or by a combination of hardware and software.

The container manager 78 executes life cycle management of a container. For example, the life cycle management includes processes relating to the construction of the container such as the deployment and setting of the container.

In this case, the platform system 30 in this embodiment may include a plurality of container managers 78. In each of the plurality of container managers 78, a container management tool such as Kubernetes, and a package manager such as Helm may be installed. Each of the plurality of container managers 78 may execute the construction of a container such as the deployment of the container for a server group (for example, Kubernetes cluster) associated with the container manager 78.

The container manager 78 is not required to be included in the platform system 30. The container manager 78 may be provided in, for example, a server (that is, the RAN 32 or the core network system 34) managed by the container manager 78, or another server that is annexed to the server managed by the container manager 78.

In this embodiment, the repository 80 stores, for example, a container image of a container included in a functional unit group (for example, NF group) that implements a network service.

The inventory database 82 is a database in which inventory information is stored. The inventory information includes, for example, information on a server arranged in the RAN 32 or the core network system 34 and managed by the platform system 30.

Further, in this embodiment, the inventory database 82 stores inventory data. The inventory data indicates the current statuses of the configuration of an element group included in the communication system 1 and the link between the elements. In addition, the inventory data indicates the status of resources managed by the platform system 30 (for example, resource usage status). The inventory data may be physical inventory data or may be logical inventory data. The physical inventory data and the logical inventory data are described later.

Figure 6:
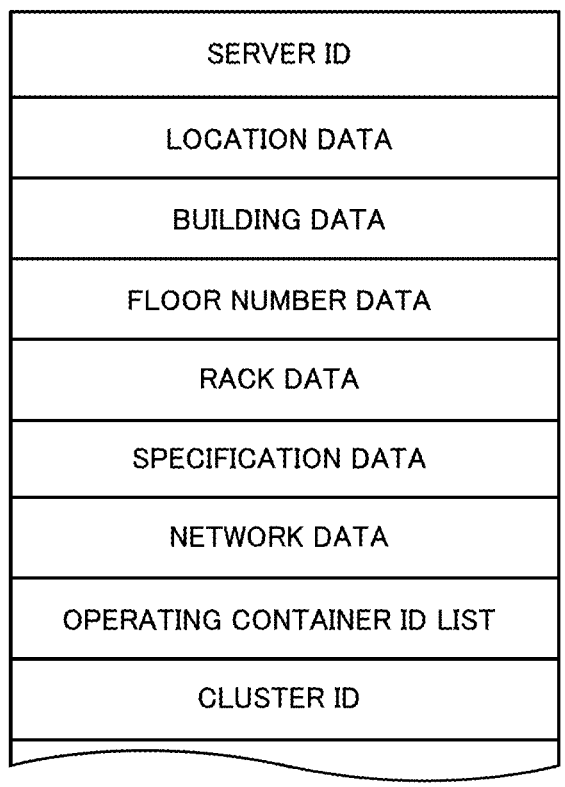
FIG. 6 is a diagram for illustrating an example of data structure of physical inventory data.

FIG. 6 is a diagram for illustrating an example of the data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, an operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data is arranged.

The rack data included in the physical inventory data is, for example, an identifier of a rack in which the server associated with the physical inventory data is arranged.

The specification data included in the physical inventory data is, for example, data indicating the specifications of the server associated with the physical inventory data. The specification data indicates, for example, the number of cores, the memory capacity, and the hard disk capacity.

The network data included in the physical inventory data is, for example, data indicating information relating to a network of the server associated with the physical inventory data. The network data indicates, for example, an NIC included in the server, the number of ports included in the NIC, and a port ID of each of the ports.

The operating container ID list included in the physical inventory data is, for example, data indicating information relating to one or a plurality of containers operating in the server associated with the physical inventory data. The operating container ID list indicates, for example, a list of identifiers (container IDs) of instances of the containers.

The cluster ID included in the physical inventory data is, for example, an identifier of a cluster (for example, Kubernetes cluster) to which the server associated with the physical inventory data belongs.

The logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NFs under the control of the certain NS. In addition, for example, the logical inventory data includes topology data including an identifier of a certain network slice and an identifier of one or a plurality of NFs belonging to the certain network slice.

The inventory data may also include data indicated by the current status of, for example, a geographical relationship or a topological relationship between the elements included in the communication system 1. As described above, the inventory data includes location data indicating locations at which the elements included in the communication system 1 are operating, that is, the current locations of the elements included in the communication system 1. It can be said therefrom that the inventory data indicates the current status of the geographical relationship between the elements (for example, geographical closeness between the elements).

The logical inventory data may also include NSI data indicating information relating to a network slice. The NSI data indicates, for example, attributes such as an identifier of an instance of the network slice and the type of the network slice. The logical inventory data may also include NSSI data indicating information relating to a network slice subnet. The NSSI data indicates, for example, attributes such as an identifier of an instance of the network slice subnet and the type of the network slice subnet.

The logical inventory data may also include NS data indicating information relating to an NS. The NS data indicates, for example, attributes such as an identifier of an instance of the NS and the type of the NS. The logical inventory data may also include NF data indicating information relating to an NF. The NF data indicates, for example, attributes such as an identifier of an instance of the NF and the type of the NF. The logical inventory data may also include CNFC data indicating information relating to a CNFC. The CNFC data indicates, for example, attributes such as an identifier of an instance and the type of the CNFC. The logical inventory data may also include pod data indicating information relating to a pod included in the CNFC. The pod data indicates, for example, attributes such as an identifier of an instance of the pod and the type of the pod. The logical inventory data may also include container data indicating information relating to a container included in the pod. The container data indicates, for example, attributes such as a container ID of an instance of the container and the type of the container.

With the container ID of the container data included in the logical inventory data and the container ID included in the operating container ID list included in the physical inventory data, an instance of the container and the server on which the instance of the container is operating become linked to each other.

Further, data indicating various attributes such as the host name and the IP address may be included in the above-mentioned data included in the logical inventory data. For example, the container data may include data indicating the IP address of a container corresponding to the container data. Further, for example, the NF data may include data indicating the IP address and the host name of an NF indicated by the NF data.

The logical inventory data may also include data indicating NSSAI including one or a plurality of pieces of S-NSSAI, which is set for each NF.

Further, the inventory database 82 can appropriately grasp the resource status in cooperation with the container manager 78. Then, the inventory database 82 appropriately updates the inventory data stored in the inventory database 82 based on the latest resource status.

Further, for example, the inventory database 82 updates the inventory data stored in the inventory database 82 in accordance with execution of an action, such as construction of a new element included in the communication system 1, a change of a configuration of the elements included in the communication system 1, scaling of the elements included in the communication system 1, or replacement of the elements included in the communication system 1.

The inventory database 82 may also include, for each NF, data indicating the importance of the location at which the NF is arranged. For example, important area flags may be linked to the inventory data of gNBs covering areas that include government offices, fire stations, and hospitals, and the like.

The inventory database 82 may also include data indicating the importance of services for elements, such as the NSes, NFs, and network slices. For example, the purchaser may specify an SLA to be satisfied by the NS to be purchased, and an important service flag may be linked to the inventory data of elements requiring guaranteed performance corresponding to the SLA.

The service catalog storage 64 stores service catalog data. The service catalog data may include, for example, service template data indicating the logic to be used by the life cycle manager 94 or the like. This service template data includes information required for constructing the network service. For example, the service template data includes information defining the NS, the NF, and the CNFC and information indicating an NS-NF-CNFC correspondence relationship. Further, for example, the service template data contains a workflow script for constructing the network service.

An NS descriptor (NSD) is an example of the service template data. The NSD is associated with a network service, and indicates, for example, the types of a plurality of functional units (for example, a plurality of CNFs) included in the network service. The NSD may indicate the number of CNEs or other functional units included in the network service for each type thereof. The NSD may also indicate a file name of a CNFD described later, which relates to the CNF included in the network service.

Further, a CNF descriptor (CNFD) is an example of the above-mentioned service template data. The CNFD may indicate computer resources (for example, CPU, memory, and hard disk drive) required by the CNF. For example, the CNFD may also indicate, for each of a plurality of containers included in the CNF, computer resources (such as CPU, memory, and hard disk drive) required by the container.

The service catalog data may also include information to be used by the policy manager 90, the information relating to a threshold value (for example, threshold value for abnormality detection) to be compared to the calculated performance index value. The performance index value is described later.

The service catalog data may also include, for example, slice template data. The slice template includes information required for executing instantiation of the network slice, and includes, for example, the logic to be used by the slice manager 92.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In this embodiment, for example, the life cycle manager 94 constructs a new network service for which a purchase request has been made in response to the purchase request for the NS by the purchaser.

The life cycle manager 94 may execute, for example, the workflow script associated with the network service to be purchased in response to the purchase request. Then, the life cycle manager 94 may execute this workflow script, to thereby instruct the container manager 78 to deploy the container included in the new network service to be purchased. Then, the container manager 78 may acquire the container image of the container from the repository 80 and deploy a container corresponding to the container image in the server.

In addition, in this embodiment, the life cycle manager 94 executes, for example, scaling or replacement of the element included in the communication system 1. In this case, the life cycle manager 94 may output a container deployment instruction or deletion instruction to the container manager 78. Then, the container manager 78 may execute, for example, a process for deploying a container or a process for deleting a container in accordance with the instruction. In this embodiment, the life cycle manager 94 can execute such scaling and replacement that cannot be handled by Kubernetes of the container manager 78 or other tools.

The life cycle manager 94 may also output an instruction to create a communication route to the SDN controller 74. For example, the life cycle manager 94 presents, to the SDN controller 74, two IP addresses at both ends of a communication route to be created, and the SDN controller 74 creates a communication route connecting those two IP addresses to each other. The created communication route may be managed so as to be linked to those two IP addresses.

The life cycle manager 94 may also output to the SDN controller 74 an instruction to create a communication route between two IP addresses linked to the two IP addresses.

In this embodiment, the slice manager 92 executes, for example, instantiation of a network slice. In this embodiment, the slice manager 92 executes, for example, instantiation of a network slice by executing the logic indicated by the slice template stored in the service catalog storage 64.

The slice manager 92 includes, for example, a network slice management function (NSMF) and a network slice sub-network management function (NSSMF) described in the third generation partnership project (3GPP) (trademark) specification "TS28 533." The NSMF is a function for generating and managing network slices, and provides an NSI management service. The NSSMF is a function for generating and managing network slice subnets forming a part of a network slice, and provides an NSSI management service.

The slice manager 92 may output to the configuration manager 76 a configuration management instruction related to the instantiation of the network slice. Then, the configuration manager 76 may execute configuration management such as settings in accordance with the configuration management instruction.

The slice manager 92 may also present, to the SDN controller 74, two IP addresses to output an instruction to create a communication route between those two IP addresses.

In this embodiment, for example, the configuration manager 76 executes configuration management such as settings of the element group including the NFs in accordance with the configuration management instruction received from the life cycle manager 94 or the slice manager 92.

In this embodiment, for example, the SDN controller 74 creates the communication route between the two IP addresses linked to the creation instruction in accordance with the instruction to create the communication route, which has been received from the life cycle manager 94 or the slice manager 92. The SDN controller 74 may create a communication route between two IP addresses through use of, for example, a publicly known path calculation method such as Flex Algo.

In this case, for example, the SDN controller 74 may use segment routing technology (for example, segment routing IPV6 (SRv6)) to construct an NSI and NSSI for the server or an aggregation router present between communication routes. The SDN controller 74 may also generate an NSI and NSSI extending over a plurality of NFs to be set by issuing, to the plurality of NFs to be set, a command to set a common virtual local area network (VLAN) and a command to assign a bandwidth and a priority indicated by the setting information to the VLAN.

The SDN controller 74 may change the maximum value of the bandwidth that can be used for communication between two IP addresses without constructing a network slice.

The platform system 30 in this embodiment may include a plurality of SDN controllers 74. Each of the plurality of SDN controllers 74 may execute a process such as the creation of a communication route for a network device group including the AGs associated with the SDN controller 74.

In this embodiment, the monitor 72 monitors, for example, the element group included in the communication system 1 based on a given management policy. In this case, for example, the monitor 72 may monitor the element group based on a monitoring policy designated by the purchaser when the purchaser purchases the network service.

In this embodiment, the monitor 72 executes monitoring at various levels, such as a slice level, an NS level, an NF level, a CNFC level, and a level of hardware such as the server.

For example, the monitor 72 may set a module for outputting metric data in the hardware such as the server, or a software element included in the communication system 1 so that monitoring can be performed at the various levels described above. In this case, for example, the NF may output the metric data indicating a metric that can be measured (can be identified) by the NF to the monitor 72. Further, the server may output the metric data indicating a metric relating to the hardware that can be measured (can be identified) by the server to the monitor 72.

In addition, for example, the monitor 72 may deploy, in the server, a sidecar container for aggregating the metric data indicating the metrics output from a plurality of containers in units of CNFCs (microservices). This sidecar container may include an agent called "exporter." The monitor 72 may repeatedly execute a process for acquiring the metric data aggregated in units of microservices from the sidecar container, at predetermined monitoring intervals through use of a mechanism of a monitoring tool, for example, Prometheus capable of monitoring the container management tool such as Kubernetes.

The monitor 72 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitor 72 may acquire metric data indicating the performance index values to be monitored.

In this embodiment, for example, the monitor 72 executes a process (enrichment) for aggregating metric data in predetermined units of aggregation to generate performance index value data indicating the performance index values of the elements included in the communication system 1 in the units of aggregation.

For example, for one gNB, the metric data indicating the metrics of the elements under control of the gNB (for example, network nodes such as DUs 42 and CUs 44) is aggregated to generate the performance index value data of the gNB. In this way, performance index value data indicating a communication performance in the area covered by the gNB is generated. For example, performance index value data indicating a plurality of types of communication performance, such as traffic amount (throughput) and latency, may be generated in each gNB. However, the communication performance indicated by the performance index value data is not limited to traffic amount and latency.

The monitor 72 outputs the performance index value data generated by the above-mentioned enrichment to the data bus 68.

In this embodiment, for example, the data bus 68 receives the performance index value data output from the monitor 72. Based on the received one or a plurality of pieces of performance index value data, the data bus 68 generates a performance index value file including the one or a plurality of pieces of performance index value data. The data bus 68 then outputs the generated performance index value file to the big-data platform 66.

Further, the elements such as the network slice, the NS, the NF, the CNFC that are included in the communication system 1 and the hardware such as the server notify the monitor 72 of various alerts (for example, notify the monitor 72 of an alert with the occurrence of a failure as a trigger).

Then, for example, when the monitor 72 receives the above-mentioned notification of the alert, the monitor 72 outputs alert message data indicating the notification to the data bus 68. Then, the data bus 68 generates an alert file in which alert message data indicating one or a plurality of notifications are compiled into one file, and outputs the generated alert file to the big-data platform 66.

In this embodiment, the big-data platform 66 accumulates, for example, the performance index value file and the alert file that have been output from the data bus 68.

In this embodiment, for example, a plurality of trained machine learning models are stored in the AI 70 in advance. The AI 70 uses various machine learning models stored in the AI 70 to execute an estimation process such as a future prediction process for a use status and quality of service of the communication system 1. The AI 70 may generate estimation result data indicating results of the estimation process.

The AI 70 may execute the estimation process based on the files accumulated in the big-data platform 66 and the above-mentioned machine learning model. This estimation process is suitable when prediction of a long-term trend is performed infrequently.

Further, the AI 70 can acquire performance index value data stored in the data bus 68. The AI 70 may execute the estimation process based on the performance index value data stored in the data bus 68 and the above-mentioned machine learning model. This estimation process is suitable when short-term predictions are performed frequently.

In this embodiment, for example, the performance manager 88 calculates, based on a plurality of pieces of metric data, a performance index value (for example, KPI) that is based on metrics indicated by those pieces of metric data. The performance manager 88 may calculate a performance index value (for example, performance index value relating to an end-to-end network slice) which is a comprehensive evaluation of a plurality of types of metrics and cannot be calculated from a single piece of metric data. The performance manager 88 may generate comprehensive performance index value data indicating a performance index value being a comprehensive evaluation.

The performance manager 88 may acquire the above-mentioned performance index value file from the big-data platform 66. Further, the performance manager 88 may acquire estimation result data from the AI 70. A performance index value such as a KPI may be calculated based on at least one of the performance index value file or the estimation result data. The performance manager 88 may directly acquire metric data from the monitor 72. Further, the performance index value such as a KPI may be calculated based on the metric data.

In this embodiment, the failure manager 86 detects the occurrence of a failure in the communication system 1 based on, for example, at least any one of the above-mentioned metric data, the above-mentioned notification of the alert, the above-mentioned estimation result data, or the above-mentioned comprehensive performance index value data. The failure manager 86 may detect, for example, the occurrence of a failure that cannot be detected from a single piece of metric data or a single notification of the alert, based on a predetermined logic. The failure manager 86 may also generate detection failure data indicating the detected failure.

The failure manager 86 may directly acquire the metric data and the notification of the alert from the monitor 72.

The failure manager 86 may also acquire the performance index value file and the alert file from the big-data platform 66. Further, the failure manager 86 may acquire the alert message data from data bus 68.

In this embodiment, the policy manager 90 executes a predetermined determination process based on, for example, at least any one of the above-mentioned metric data, the above-mentioned performance index value data, the above-mentioned alert message data, the above-mentioned performance index value file, the above-mentioned alert file, the above-mentioned estimation result data, the above-mentioned comprehensive performance index value data, or the above-mentioned detection failure data.

Then, the policy manager 90 may execute an action corresponding to a result of the determination process. For example, the policy manager 90 may output an instruction to construct a network slice to the slice manager 92. The policy manager 90 may also output an instruction for scaling or replacement of the elements to the life cycle manager 94 based on the result of the determination process.

The policy manager 90 in this embodiment can acquire the performance index value data stored in the data bus 68. The policy manager 90 may then execute a predetermined determination process based on the performance index value data acquired from the data bus 68. The policy manager 90 may also execute a predetermined determination process based on the alert message data stored in the data bus 68.

In this embodiment, the ticket manager 84 generates, for example, a ticket indicating information to be notified to an administrator of the communication system 1. The ticket manager 84 may generate a ticket indicating details of the detection failure data. The ticket manager 84 may also generate a ticket indicating a value of the performance index value data or the metric data. The ticket manager 84 may also generate a ticket indicating a determination result obtained by the policy manager 90.

Then, the ticket manager 84 notifies the administrator of the communication system 1 of the generated ticket. The ticket manager 84 may send, for example, an email to which the generated ticket is attached to an email address of the administrator of the communication system 1.

The generation of the performance index value file, the determination process based on the performance index value data stored in the data bus 68, and the estimation process based on the performance index value data stored in the data bus 68 are further described in the following.

Figure 7:
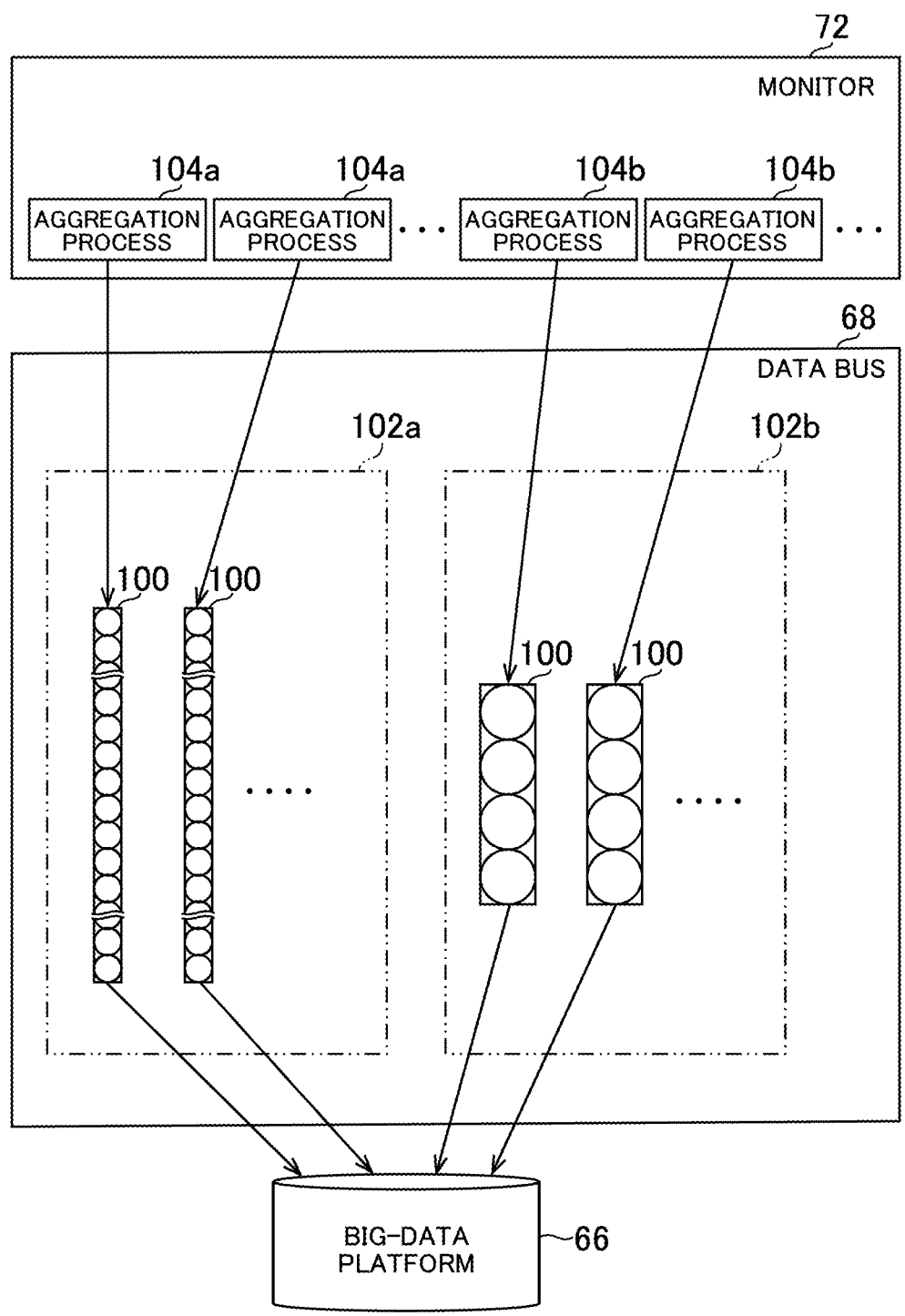
FIG. 7 is a diagram for schematically illustrating an example of a data bus in the one embodiment of the present invention.

FIG. 7 is a diagram for schematically illustrating an example of the data bus 68 in this embodiment. As illustrated in FIG. 7, the data bus 68 in this embodiment includes, for example, a plurality of queues 100 that hold performance index value data in a first-in, first-out list structure.

Each queue 100 belongs to any one of a first queue group 102a or a second queue group 102b.

In this embodiment, for example, a plurality of aggregation processes 104 are operating in the monitor 72. In each aggregation process 104, the elements to be aggregated in the aggregation process 104 are preset. For example, in each aggregation process 104, the gNBs to be aggregated in the aggregation process 104 are preset. Each aggregation process 104 acquires metric data from the NFs (for example, RUs 40, DUs 42, and CU-UPs 44b) under the control of the gNBs to be aggregated in the aggregation process 104. Further, the aggregation process 104 executes an enrichment process for generating performance index value data indicating the communication performance of the gNB based on the acquired metric data.

Further, in this embodiment, for example, the aggregation process 104 and the queue 100 are linked in advance. For convenience, in FIG. 7, a case in which the aggregation process 104 and the queue 100 are linked in a one-to-one relationship is illustrated, but the aggregation process 104 and the queue 100 may be linked in a many-to-many relationship.

The aggregation processes 104 linked to the queues 100 included in the first queue group 102a are hereinafter referred to as "first group aggregation processes 104a." Further, the aggregation processes 104 linked to the queues 100 included in the second queue group 102b are hereinafter referred to as "second group aggregation processes 104b."

At predetermined time intervals (for example, every minute), each first group aggregation process 104a generates performance index value data by aggregating the metric data associated with the first group aggregation process 104a from the previous aggregation to the present time.

The first group aggregation process 104a acquires the metric data from one or a plurality of NFs associated with the first group aggregation process 104a at intervals of, for example, one minute. Then, the first group aggregation process 104a generates performance index value data for the aggregation period by aggregating the metric data for the same aggregation period.

Each time the first group aggregation process 104a generates performance index value data, the first group aggregation process 104a enqueues the performance index value data into one or a plurality of queues 100 linked to the first group aggregation process 104a.

At predetermined time intervals (for example, every fifteen minutes), each second group aggregation process 104b generates performance index value data by aggregating the metric data associated with the second group aggregation process 104b from the previous aggregation to the present time.

The second group aggregation process 104b acquires the metric data from one or a plurality of NFs associated with the second group aggregation process 104b at intervals of, for example, fifteen minutes. Then, the second group aggregation process 104b generates performance index value data for the aggregation period by aggregating the metric data for the same aggregation period.

Each time the second group aggregation process 104b generates performance index value data, the second group aggregation process 104b enqueues the performance index value data into one or a plurality of queues 100 linked to the second group aggregation process 104b.

In this embodiment, the maximum number of pieces of performance index value data that is storable in the queues 100 included in the first queue group 102a is determined in advance. In this case, for example, it is assumed that a maximum of 240 pieces of performance index value data is storable in the queues 100. That is, the maximum number is "240."

Further, in this embodiment, the maximum number of pieces of performance index value data that is storable in the queues 100 included in the second queue group 102b is determined in advance. In this case, for example, it is assumed that a maximum of four pieces of performance index value data is storable in the queues 100. That is, the maximum number is "4."

In this embodiment, for example, a certain one NF may be linked to both the first group aggregation process 104a and the second group aggregation process 104b. To the first group aggregation process 104a, the certain NF may output metric data of the type to be aggregated by the first group aggregation process 104a at intervals of one minute. Further, to the second group aggregation process 104b, the NF may output metric data of the type to be aggregated by the second group aggregation process 104b at intervals of 15 minutes.

The type of the metric data output to the first group aggregation process 104a and the type of the metric data output to the second group aggregation process 104b may be the same or different.

In this case, for example, among the metrics to be monitored by the NF, the metric data of a part of the metrics for which it is desirable to monitor in real time may be output to the first group aggregation process 104a.

In this embodiment, for example, a plurality of determination processes 106 (see FIG. 8 and FIG. 9) are operating in the policy manager 90. A part of those determination processes 106 execute determination processes based on the performance index value data stored in the data bus 68, and the rest of the determination processes 106 execute determination processes based on files stored in the big-data platform 66.

The determination processes 106 in this embodiment include a process for acquiring performance index value data indicating an actual result value of the performance index value relating to the communication system 1. For example, there is a determination process 106 for acquiring performance index value data in response to the performance index value data being enqueued in a queue 100 included in the first queue group 102a.

In this embodiment, the queues 100 included in the first queue group 102a are configured so that the performance index value data can be accessed (acquired) without dequeuing any of the performance index value data included in the queue 100.

The determination process 106 determines the status of the communication system 1 based on the acquired performance index value data. In this case, for example, the status of the element which are included in the communication system 1 and are associated with the determination process 106 may be determined. For example, the status of the element to be aggregated in the first group aggregation process 104a which has generated the performance index value data to be acquired by the determination process 106 may be determined. Such a determination process 106 is hereinafter referred to as "actual result determination process 106a."

In this embodiment, for example, the actual result determination process 106a and the queue 100 are linked in advance. For convenience, in FIG. 8 and FIG. 9, a case in which the actual result determination process 106a and the queue 100 are linked in a one-to-one relationship is illustrated, but the actual result determination process 106a and the queue 100 may be linked in a many-to-many relationship.

In this case, for example, in response to performance index value data being enqueued in a queue 100 included in the first queue group 102a, the data bus 68 may output a notification indicating that the performance index value data has been enqueued to one or a plurality of actual result determination processes 106a linked to the queue 100.

The actual result determination process 106a which has received the notification may acquire, in response to the reception of the notification, the latest performance index value data stored in the queue 100.

Further, the determination processes 106 this embodiment include a process for acquiring estimation result data indicating an estimation result obtained by an estimation process 108 (see FIG. 9) linked to the determination process 106.

The determination process 106 determines the status of the communication system 1 based on the acquired estimation result data. In this case, for example, the status of the element which are included in the communication system 1 and are associated with the determination process 106 may be determined. For example, the status of the element to be aggregated in the first group aggregation process 104a which has generated the performance index value data to be acquired by the estimation process 108 may be determined. Such a determination process 106 is hereinafter referred to as "prediction determination process 106b."

Further, in this embodiment, for example, a plurality of estimation processes 108 (see FIG. 9) are operating in the AI 70. A part of those estimation processes 108 execute estimation processes based on the performance index value data stored in the data bus 68, and the rest of the estimation processes 108 execute estimation processes based on files stored in the big-data platform 66.

Further, in this embodiment, for example, the estimation process 108 and the queue 100 are linked in advance. For convenience, in FIG. 8, a case in which the estimation process 108 and the queue 100 are linked in a one-to-one relationship is illustrated, but the estimation process 108 and the queue 100 may be linked in a many-to-many relationship.

In this embodiment, for example, each estimation process 108 acquires the performance index value data stored in the queue 100 which corresponds to the estimation process 108 and which is included in the first queue group 102a. The estimation processes execute the estimation process determined in advance for the relevant estimation process 108 based on the performance index value data.

In this case, for example, in response to performance index value data being enqueued in a queue 100 included in the first queue group 102a, the estimation process 108 acquires a predetermined number of most recent pieces of the performance index value data or the performance index value data of a most recent predetermined period including at least the latest performance index value data among the performance index value data stored in the queue 100.

In this case, for example, in response to performance index value data being enqueued in a queue 100 included in the first queue group 102a, the data bus 68 may output a notification indicating that the performance index value data has been enqueued to one or a plurality of estimation processes 108 linked to the queue 100.

When the estimation process 108 receives the notification, in response to the received notification, the estimation process 108 may acquire a predetermined number of most recent pieces of the performance index value data or the performance index value data of a most recent predetermined period including at least the latest performance index value data among the performance index value data stored in the queue 100.

Figure 9:
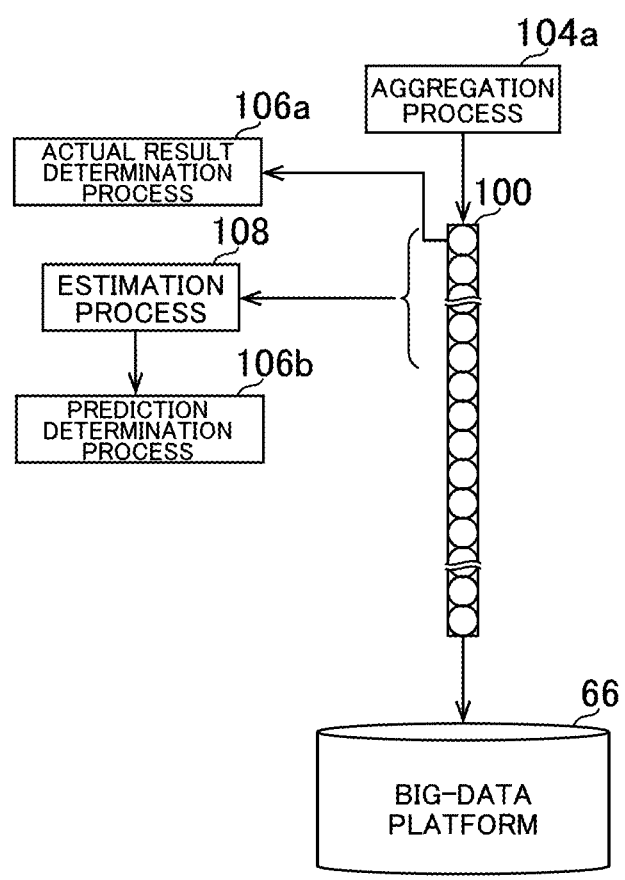
FIG. 9 is a diagram for schematically illustrating an example of acquisition of performance index value data by the actual result determination process and an estimation process.

In this case, for example, the estimation process 108 illustrated in FIG. 9 acquires 60 pieces of performance index value data, including the latest performance index value data. Those pieces of performance index value data correspond to the most recent 60 minutes of performance index value data, including the latest performance index value data. The estimation process 108 then executes the estimation process based on the acquired performance index value data.

For example, the first group aggregation process 104a associated with a certain specific gNB generates performance index value data relating to the gNB by aggregating the metric data relating to the elements included in the gNB (for example, elements under the control of the gNB). In response to the performance index value data being enqueued in the queue 100, the estimation process 108 which acquires the performance index value data generated by the first group aggregation process 104a acquires 60 pieces of performance index value data including the latest performance index value data stored in the queue 100.

In this case, the estimation process 108 uses a trained machine learning model stored in advance in the AI 70 to predict the level of the network load of the gNB from the current time to 20 minutes after the current time based on those 60 pieces of performance index value data. In this case, a prediction of the traffic amount (throughput) or latency, for example, may be executed as the level of the network load of the gNB.

The machine learning model may be, for example, an existing prediction model. Further, for example, the machine learning model may be a trained machine learning model in which supervised learning using a plurality of pieces of training data has been executed in advance. In this case, each of those plurality of pieces of training data may include, for example, for given time points different from each other, learning input data indicating the traffic amount in the gNB for 60 minutes until the time point and teacher data indicating the level of the network load (for example, traffic amount or latency) of the gNB from the time point until 20 minutes after the time point.

It is not required that the estimation process 108 acquire a part of the performance index value data stored in the queue 100 as described above, and the estimation process 108 may acquire all the performance index value data stored in the queue 100.

Then, the estimation process 108 outputs estimation result data indicating the execution result (estimation result) of the estimation process to the prediction determination process 106b linked to the estimation process 108. The prediction determination process 106b then acquires the estimation result data, and then determines the status of the communication system 1 based on the acquired estimation result data.

As described above, the queue 100 in this embodiment is linked to the aggregation process 104, the actual determination process 106a, the prediction determination process 106b, and the estimation process 108.

Further, in this embodiment, for example, the data bus 68 generates a performance index value file including at least a part of the performance index value data stored in the queue 100 at a frequency lower than the frequency at which the AI 70 acquires the performance index value data.

For example, the data bus 68 may generate, at predetermined time intervals, a performance index value file including the performance index value data stored in the queue 100 after a previous timing of generation of the performance index value file.

In this case, the time interval may or may not match the time (60 minutes in the above example) corresponding to the maximum number of pieces of performance index value data that is storable in the queues 100 included in the first queue group 102a.

Further, for example, the data bus 68 may generate a file including all the performance index value data stored in the queue 100 in response to dequeuing of all the performance index value data included in the generated performance index value file. That is, the file including all the performance index value data stored in the queue 100 may be generated in response to the replacement of all the performance index value data stored in the queue 100.

Further, in this embodiment, in a case in which 60 pieces of performance index value data are stored in a queue 100 included in the first queue group 102a, when new performance index value data is enqueued, the oldest performance index value data stored in the queue 100 is dequeued. That is, the oldest performance index value data stored in the queue 100 is erased from the queue 100.

In this embodiment, when four pieces of performance index value data are stored in a queue 100 included in the second queue group 102b, the data bus 68 generates a performance index value file in which those four pieces of performance index value data are consolidated into one file. The data bus 68 then outputs the generated performance index value file to the big-data platform 66.

The data bus 68 dequeues all the performance index value data stored in the queue 100. That is, all the performance index value data stored in the queue 100 is erased from the queue 100.

In this way, the process executed in response to the generation of the performance index value file is different for the queues 100 included in the first queue group 102a from that for the queues 100 included in the second queue group 102b. For the queues 100 included in the second queue group 102b, all the performance index value data stored in a queue 100 is erased from the queue 100 in response to the generation of the performance index value file. Meanwhile, for the queues 100 included in the first queue group 102a, dequeuing in response to the generation of the performance index value file is not executed.

Figure 8:
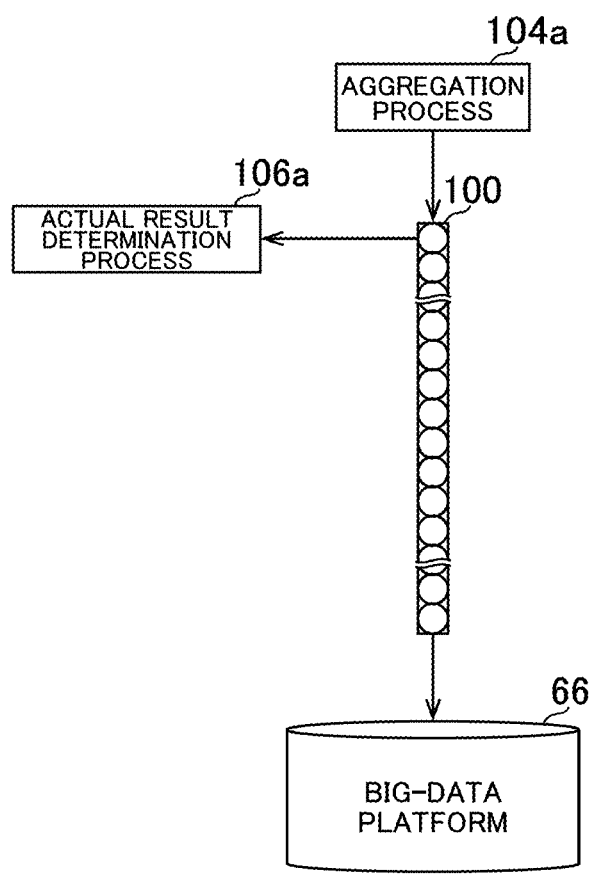
FIG. 8 is a diagram for schematically illustrating an example of acquisition of performance index value data by an actual result determination process.

In this embodiment, for example, when the network service is constructed, not only the element included in the network service, but, as illustrated in FIG. 8, the queue 100, the aggregation process 104, and the actual result determination process 106a linked to the element are also generated.

At this time, the policy manager 90 may refer to the inventory data to confirm an attribute of the element associated with the generated actual result determination process 106a. The policy manager 90 may then generate an actual result determination process 106a in which a workflow corresponding to the confirmed attribute is set. Further, the actual result determination process 106a may execute the determination process by executing the workflow set for the actual result determination process 106a.

In this embodiment, for example, the actual result determination process 106a determines whether or not scale-out is required based on the acquired performance index value data.

In this embodiment, for example, the platform system 30 executes scale-out of the element included in the communication system 1 in response to a determination that scale-out is required. For example, the policy manager 90, the life cycle manager 94, the container manager 78, and the configuration manager 76 may cooperate with each other to execute scale-out. For example, the scale-out of the DUs 42 or CU-UPs 44b included in a certain specific gNB may be executed based on the performance index value data relating to the certain specific gNB in response to the determination that the scale-out is required.

For example, the actual result determination process 106a may determine whether or not the acquired performance index value data satisfies a predetermined first scale-out condition. In this case, it may be determined whether or not the performance index value indicated by the performance index value data exceeds a threshold value th1. This performance index value may be a value indicating the level of the network load, such as the traffic amount (throughput) or latency. When it is determined that the first scale-out condition is satisfied (for example, when it is determined that the performance index value exceeds the threshold value th1), scale-out of the element included in the communication system 1 may be executed.

Further, in this embodiment, the actual result determination process 106a determines whether or not network load prediction is required based on the acquired performance index value data, for example. In this embodiment, for example, the platform system 30 starts network load prediction in response to a determination that the network load prediction is required.

Further, for example, the actual result determination process 106a may determine whether or not the acquired performance index value data satisfies a predetermined prediction start condition. For example, it may be determined whether or not the performance index value indicated by the performance index value data exceeds a threshold value th2. In this case, the threshold value th2 may be a value smaller than the threshold value th1. That is, the threshold value th1 may be a value larger than the threshold value th2. Then, network load prediction may be started in response to a determination that the prediction start condition is satisfied (for example, when it is determined that the performance index value exceeds the threshold value th2).

As described above, in this embodiment, the actual result determination process 106a may determine that network load prediction is required when the value indicating the level of the network load indicated by the performance index value data exceeds the threshold value th2. Then, when the value indicating the level of the network load indicated by the performance index value data exceeds the threshold value th1 which is larger than the threshold value th2, the actual result determination process 106a may determine that scale-out is required.

For example, there is assumed a case in which, as illustrated in FIG. 3, in a situation in which the actual result determination process 106a is operating, the actual result determination process 106a determines that network load prediction is required. For example, a predetermined prediction start condition is satisfied.

In such a case, the AI 70 generates an estimation process 108 linked to the actual result determination process 106a, and the policy manager 90 generates a prediction determination process 106b linked to the actual result determination process 106a. In this case, for example, the estimation process 108 and the prediction determination process 106b may be activated. At this time, instantiation of a trained machine learning model may also be executed. The estimation process 108 may then execute the estimation using the instantiated machine learning model.

Then, the prediction determination process 106b may execute a predetermined determination process based on the estimation result data output by the estimation process 108 linked to the prediction determination process 106b. For example, the prediction determination process 106b may determine whether or not scale-out is required based on the network load prediction result.

In this embodiment, for example, as illustrated in FIG. 9, in response to performance index value data being enqueued in a queue 100 included in the first queue group 102a, the actual result determination process 106a may acquire the enqueued performance index value data, and the estimation process 108 may acquire, of the performance index value data stored in the queue 100, a predetermined number of most recent pieces of the performance index value data or the performance index value data of a most recent predetermined period including at least the enqueued performance index value data. In this way, in response to performance index value data being enqueued in a queue 100, the enqueued performance index value data may be acquired by both the actual result determination process 106a and the estimation process 108.

Then, the actual result determination process 106a may determine whether or not scale-out is required based on the acquired performance index value data.

Further, the estimation process 108 may generate estimation result data indicating the network load prediction result based on the acquired performance index value data. The estimation process 108 may then output the generated estimation result data to the prediction determination process 106b. The prediction determination process 106b may acquire the estimation result data.

Then, the prediction determination process 106b may determine whether or not scale-out is required based on the acquired estimation result data.

It is not required that the AI 70 generate the estimation process 108 and that the policy manager 90 generate the prediction determination process 106b. For example, the actual result determination process 106a may generate the estimation process 108 and the prediction determination process 106b.

In this embodiment, for example, the platform system 30 executes scale-out of the element included in the communication system 1 in response to a determination that scale-out is required.

For example, the prediction determination process 106b may determine whether or not the predicted value of the network load indicated by the estimation result data satisfies a predetermined second scale-out condition. For example, it may be determined whether or not the predicted value exceeds a threshold value th3. In this case, for example, it may be determined whether or not, among a plurality of predicted values from the current time to 20 minutes after the current time, there is a predicted value which exceeds the threshold value th3. The predicted value may be a value indicating the level of the network load, such as the traffic amount (throughput) or latency. Scale-out of the element included in the communication system 1 may be executed in response to a determination that a second scale-out condition is satisfied. The second scale-out condition may be the same as or different from the first scale-out condition described above.

As described above, in this embodiment, the prediction determination process 106b determines whether or not scale-out is required based on the network load prediction result after the network load prediction is started. Meanwhile, the actual result determination process 106a determines whether or not scale-out is required based on the performance index value data without relying on the network load prediction result.

Then, in response to a determination by the actual result determination process 106a or the prediction determination process 106b that scale-out is required, the policy manager 90, the life cycle manager 94, the container manager 78, and the configuration manager 76 execute scale-out of the element included in the communication system 1.

Further, in this embodiment, the estimation process 108 ends network load prediction in response to satisfaction of a predetermined condition. That is, the estimation process 108 and the prediction determination process 106b are eliminated or stopped. Thus, in this embodiment, by not constantly predicting the network load (in other words, by ending a periodic or temporary prediction), wasteful use of computer resource capacity and wasteful consumption of power can be suppressed. The condition for ending network load prediction may be appropriately determined in accordance with the specifications of the communication system 1 and requests from the users using the communication system 1, for example.

For example, in response to scale-out of the element in the manner described above, the estimation process 108 associated with the element and the prediction determination process 106b may be ended (the processes may be killed).

Further, the prediction determination process 106b may determine whether or not the predicted value of the network load indicated by the estimation result data is below a threshold value th4. Then, in response to a determination that the predicted value of the network load indicated by the estimation result data is below the threshold value th4, the prediction determination process 106b and the estimation process 108 linked to the prediction determination process 106b may be ended (the processes may be killed).

Now, an example of a flow of a process relating to the determination of the status of the communication system 1 by the actual result determination process 106a, which is performed by the platform system 30 in this embodiment, is described with reference to a flow chart exemplified in FIG. 10.

In this process example, the data bus 68 monitors enqueuing of performance index value data for each queue 100 included in the first queue group 102a (Step S101).

Then, when enqueuing of performance index value data in the queue 100 is detected, the actual result determination process 106a linked to the queue 100 acquires the performance index value data (Step S102).

Then, the actual result determination process 106a determines whether or not the performance index value indicated by the performance index value data acquired in the process step of Step S102 exceeds the threshold value th1 (Step S103).

When it is determined that the performance index value exceeds the threshold value th1 ("Y" in Step S103), the policy manager 90, the life cycle manager 94, the container manager 78, and the configuration manager 76 execute scale-out of the element associated with the actual result determination process 106a (Step S104), and the process returns to the process step of Step S101.

When it is determined that the performance index value does not exceed the threshold value th1 ("N" in Step S103), the actual result determination process 106a determines whether or not an estimation process 108 and a prediction determination process 106b linked to the actual result determination process 106a have been generated, and whether or not the performance index value exceeds the threshold value th2 (Step S105). As described above, the threshold value th2 may be a value smaller than the threshold value th1 described above.

When it is determined that the estimation process 108 and the prediction determination process 106b have not yet been generated and the performance index value exceeds the threshold value th2 ("Y" in Step S105), the AI 70 generates an estimation process 108 linked to the actual result determination process 106a, and the policy manager 90 generates a prediction determination process 106b linked to the actual result determination process 106a (Step S106). Then, the process returns to the process step of Step S101. In this way, the estimation process by the estimation process 108 and the determination process by the prediction determination process 106b are started.

In the process step of Step S105, when it is determined that the estimation process 108 and the prediction determination process 106b have been generated, or when it is determined that the performance index value does not exceed the threshold value th2 ("N" in Step S105), the process returns to the process step of Step S101.

It is undesirable to constantly predict the network load for all elements included in the communication system 1 because such prediction is a wasteful use of computer resource capacity and wasteful consumption of power.

As described above, in this embodiment, network load prediction is started in response to a determination that network load prediction is required based on performance index value data. After the network load prediction is started, scale-out of the element included in the communication system 1 is executed in response to the determination that the scale-out is required based on the network load prediction result. In this way, in this embodiment, network load prediction for executing scale-out of the element included in the communication system 1 is started at an appropriate timing.

Further, in this embodiment, even when in a status in which network load prediction has not been performed, whether or not scale-out is required is determined based on the performance index value data, without relying on a network load prediction result. Then, scale-out of the element included in the communication system 1 is executed in response to a determination that the scale-out out is required.

For example, even when in a status in which network load prediction has not been performed, when the performance index value exceeds the threshold value th1, scale-out of the element included in the communication system 1 is executed.

In this way, in this embodiment, regardless of whether or not network load prediction is executed, when there occurs a situation requiring scale-out of the element included in the communication system 1, the element is appropriately scaled out.

Next, another example of a flow of a process relating to the determination of the status of the communication system 1 by the actual result determination process 106a, which is performed by the platform system 30 in this embodiment, is described with reference to a flow chart exemplified in FIG. 11.

The process steps of from Step S201 to Step S204 are the same as the process steps of from Step S101 to Step S104, and hence description of those process steps is omitted.

In the process step of Step S203, when it is determined that the performance index value does not exceed the threshold th1 ("N" in Step S203), the actual result determination process 106a determines a threshold value "x" based on the usage amount of computer resources (Step S205).

For example, the threshold value "x" may be determined based on a ratio of the number of determination processes 106 being executed with respect to a maximum number of determination processes 106 determined in advance.

For example, when the ratio is less than 50%, a value x1 may be determined as the threshold value "x". Further, when the ratio is 50% or more and less than 80%, a value x2 may be determined as the threshold value "x". The value x2 may be a value larger than the value x1. Moreover, when the ratio is 80% or more, a value x3 may be determined as the threshold value "x". The value x3 may be a value larger than the value x2. In this embodiment, for example, all of the value x1, the value x2, and the value x3 are values smaller than the above-mentioned threshold value th1.

Each of the value x1, the value x2, and the value x3 may be a value equal to or larger than the above-mentioned threshold value th2, or may be a value equal to or smaller than the above-mentioned threshold value th2. Further, for example, all of the value x1, the value x2, and the value x3 may be values equal to or larger than the above-mentioned threshold value th2.

The actual result determination process 106a determines whether or not the estimation process 108 and the prediction determination process 106b linked to the actual result determination process 106a have been generated, and whether or not the performance index value exceeds the threshold value "x" determined in the process step of Step S205 (Step S206).

It is assumed that it is determined in the process step of Step S206 that the estimation process 108 and the prediction determination process 106b have not yet been generated and that the performance index value exceeds the threshold value "x" ("Y" in Step S206). In this case, the AI 70 generates an estimation process 108 linked to the actual result determination process 106a, and the policy manager 90 generates a prediction determination process 106b linked to the actual result determination process 106a (Step S207). Then, the process returns to the process step of Step S201. In this way, the estimation process by the estimation process 108 and the determination process by the prediction determination process 106b are started.

Figure 11:
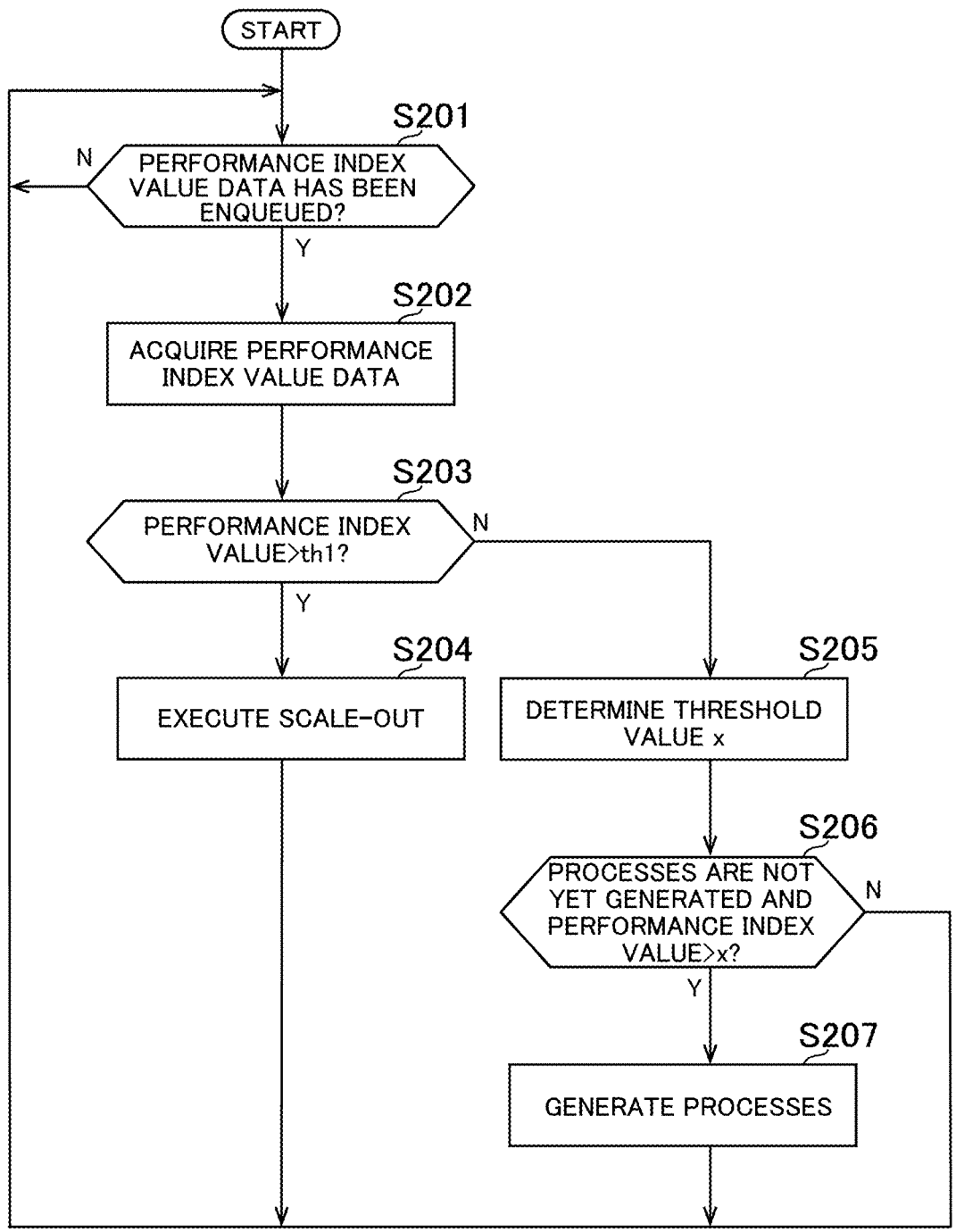
FIG. 11 is a flow chart for illustrating an example of a flow of a process performed by the platform system in the one embodiment of the present invention.

As illustrated in FIG. 11, in this embodiment, the actual result determination process 106a may determine, based on a usage amount of computer resources, a determination criterion relating to whether or not network load prediction is required.

Then, the actual result determination process 106a may determine whether network load prediction is required based on the performance index value data and the determined determination criterion. For example, the actual result determination process 106a may determine a first threshold value (for example, the above-mentioned threshold value "x") based on the usage amount of computer resources. Then, when a value indicating the level of the network load indicated by the performance index value data exceeds the first threshold value, the actual result determination process 106a may determine that network load prediction is required.

Further, network load prediction may be started in response to a determination that the network load prediction is required.

In this way, network load prediction for executing scale-out of the element included in the communication system 1 is started at an appropriate timing. Further, it becomes possible to control whether or not to start network load prediction in accordance with the usage amount of computer resources. For example, it is possible to prevent network load prediction from starting when computer resources are tight.

The index indicating the usage amount of computer resources is not limited to the ratio of the number of determination processes 106 being executed with respect to the maximum number of determination processes 106 as described above. For example, the determination criterion relating to whether network load prediction is required may be determined based on the number of determination processes 106 being executed. Further, the determination criterion relating to whether or not network load prediction is required may be determined based on a ratio of the number of prediction determination processes 106b being executed with respect to a maximum number of prediction determination processes 106b determined in advance. Moreover, the determination criterion relating to whether or not network load prediction is required may be determined based on the number of prediction determination processes 106b being executed. Further, the determination criterion relating to whether or not network load prediction is required may be determined based on a ratio of the number of estimation processes 108 being executed with respect to a maximum number of estimation processes 108 determined in advance. Moreover, the determination criterion relating to whether or not network load prediction is required may be determined based on the number of estimation processes 108 being executed. Further, the determination criterion relating to whether or not network load prediction is required may be determined based on a CPU usage rate, a memory usage rate, or a storage usage rate, for example.

Further, the determination criterion relating to whether or not network load prediction is required is not limited to the threshold value "x" as in the example described above. For example, a condition relating to performance index value data may be determined based on the usage amount of computer resources. Then, when the acquired performance index value data satisfies the condition, network load prediction may be started.

Further, when the value indicating the level of the network load indicated by the performance index value data exceeds a second threshold value (for example, the above-mentioned threshold value th1) which is larger than the above-mentioned first threshold value, the actual result determination process 106a may determine that scale-out is required.

Further, in this embodiment, the policy manager 90 may determine whether or not to execute a determination of whether or not network load prediction based on the usage amount of computer resources is required in accordance with an importance level of the element to be scaled out.

Figure 10:
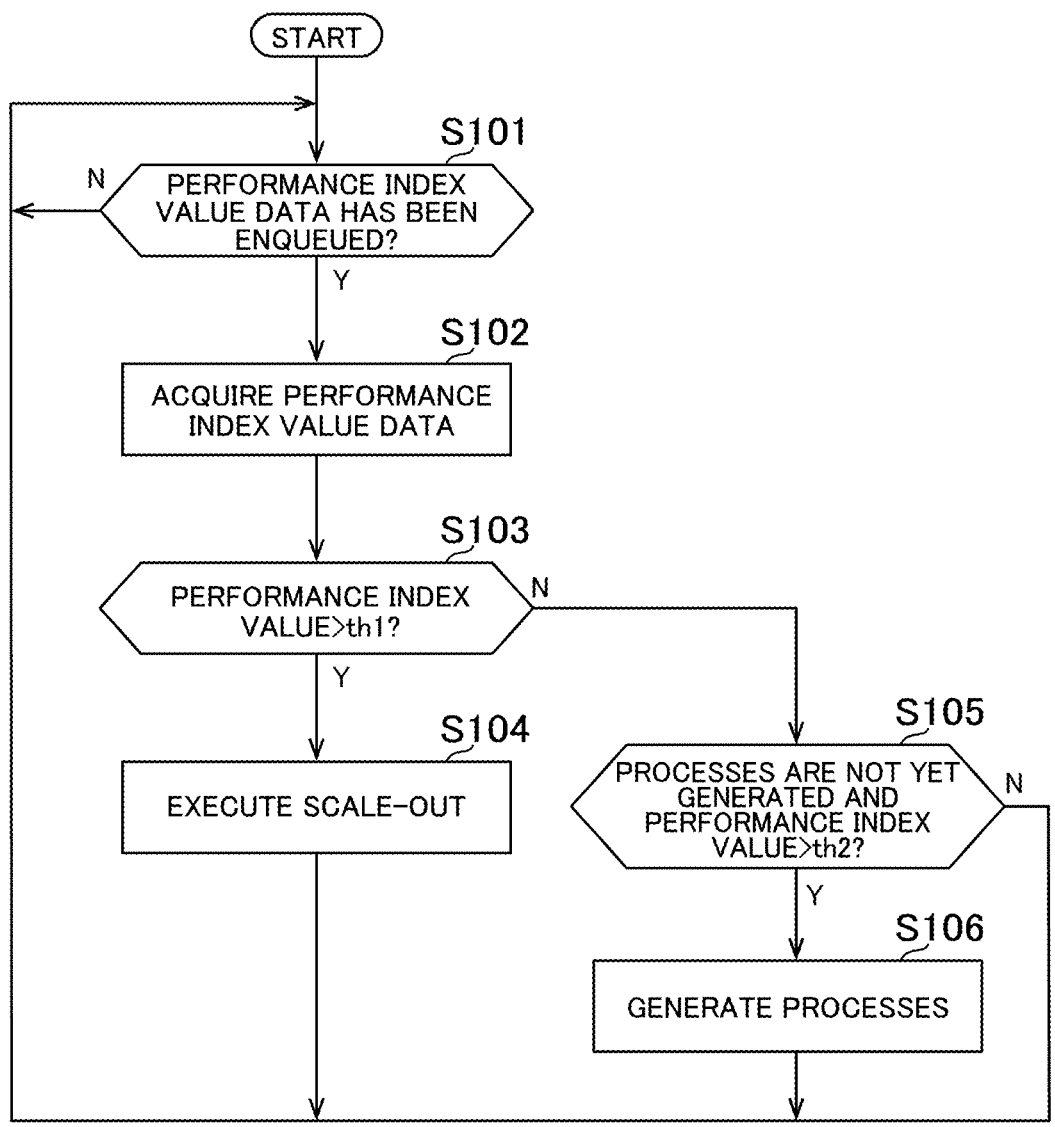
FIG. 10 is a flow chart for illustrating an example of a flow of a process performed by the platform system in the one embodiment of the present invention.

For example, the process of FIG. 10 may be a process corresponding to a first type workflow, and the process of FIG. 11 may be a process corresponding to a second type workflow.

For example, when the actual result determination process 106a is generated, the policy manager 90 may confirm an importance level of the element associated with the generated actual result determination process 106a based on the inventory data. Further, an actual result determination process 106a in which a workflow corresponding to the confirmed importance level is set may be generated. For example, for elements in which an important area flag or an important service flag is linked to the inventory data, an actual result determination process 106a in which the first type workflow is set may be generated. Moreover, for elements in which an important area flag or an important service flag is not linked to the inventory data, an actual result determination process 106a in which the second type workflow is set may be generated.

In this case, in the actual result determination process 106a in which the first type workflow is set, whether or not network load prediction not based on the usage amount of computer resources is required is determined. Further, in the actual result determination process 106a in which the second type workflow is set, whether or not network load prediction based on the usage amount of computer resources is required is determined.

In this way, it is possible to switch whether or not to consider the usage amount of computer resources in determining whether or not to start network load prediction in accordance with the importance level of the element to be scaled out. Thus, for example, for important elements, it is possible to start network load prediction even when computer resources are tight.

Figure 12:
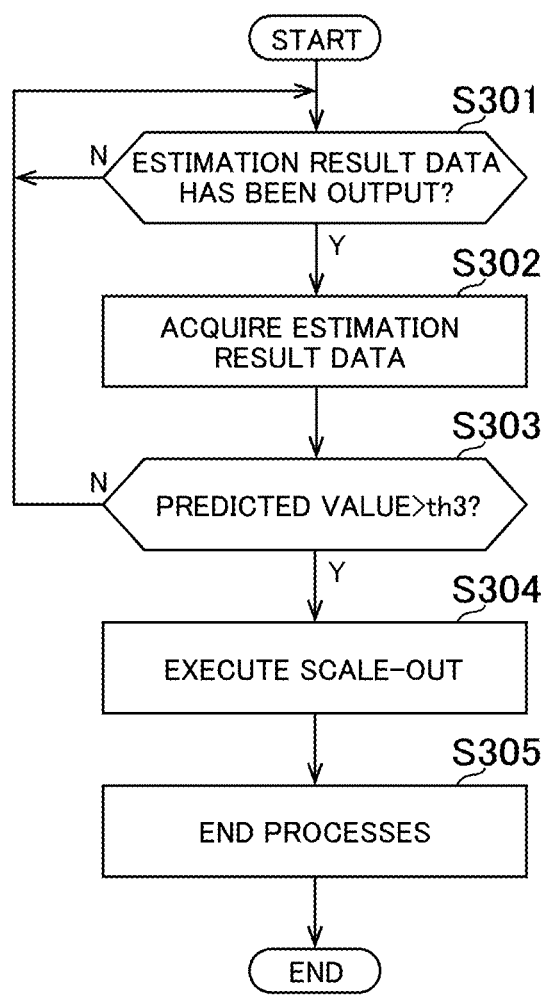
FIG. 12 is a flow chart for illustrating an example of a flow of a process performed by the platform system in the one embodiment of the present invention.

Next, an example of a flow of a process relating to the determination of the status of the communication system 1 by the prediction determination process 106b, which is performed by the platform system 30 in this embodiment, is described with reference to a flow chart exemplified in FIG. 12.

In this process example, the prediction determination process 106b monitors output of estimation result data from the estimation process 108 linked to the prediction determination process 106b (Step S301).

When output of estimation result data from the estimation process 108 is detected, the prediction determination process 106b acquires the prediction result data (Step S302).

Then, the prediction determination process 106b determines whether or not the predicted value indicating the level of the network load indicated by the prediction result data acquired in the process step of Step S302 exceeds the threshold value th3 (Step S303).

When it is determined that the predicted value does not exceed the threshold value th3 ("N" in Step S303), the process returns to the process step of Step S301.

When it is determined that the predicted value exceeds the threshold value th3 ("Y" in Step S303), the policy manager 90, the life cycle manager 94, the container manager 78, and the configuration manager 76 execute scale-out of the element associated with the actual result determination process 106a (Step S304). Then, the prediction determination process 106b ends (kills) the estimation process 108 linked to the prediction determination process 106b and the prediction determination process 106b itself (Step S305), and the process illustrated in this process example is ended.

In the process examples illustrated in FIG. 10 and FIG. 11, when the estimation process 108 and the prediction determination process 106b have been generated, the actual result determination process 106a may determine whether or not the performance index value indicated by the acquired performance index value data is less than the threshold value th4. When it is determined that the performance index value is less than the threshold value th4, the actual result determination process 106a may end (kill) the estimation process 108 linked to the actual result determination process 106a and the prediction determination process 106b.

It should be noted that the present invention is not limited to the above-mentioned embodiment.

For example, in this embodiment, scale-out of the element of the core network system 34 may be executed in place of the element of the RAN 32 such as a gNB. For example, scale-out may be executed on the AMFs 46, the SMFs 48, and the UPFs 50. Further, in this case, performance index value data relating to the element of the core network system 34 may be used to determine whether or not to execute scale-out. As another example, performance index value data relating to the element of the RAN 32 and the element of the core network system 34 may be used for the determination.

Further, scale-out of transport may be executed in the same way.

Further, the functional unit in this embodiment is not limited to those illustrated in FIG. 3.

Further, the functional unit in this embodiment is not required to be an NF in 5G. For example, the functional unit in this embodiment may be an eNodeB, a vDU, a vCU, a packet data network gateway (P-GW), a serving gateway (S-GW), a mobility management entity (MME), a home subscriber server (HSS), or another network node in 4G.

Further, the functional unit in this embodiment may be implemented through use of a hypervisor-type or host-type virtualization technology instead of the container-type virtualization technology. Further, the functional unit in this embodiment is not required to be implemented by software, and may be implemented by hardware such as an electronic circuit. Further, the functional unit in this embodiment may be implemented by a combination of an electronic circuit and software.

The technology disclosed in the present disclosure can also be expressed as follows.

[1] A scale-out execution system including: performance index value data acquisition means for acquiring performance index value data indicating an actual result value of a performance index value relating to a communication system; determination criterion determination means for determining, based on a usage amount of computer resources, a determination criterion relating to whether network load prediction is required; first determination means for determining, based on the performance index value data and the determination criterion, whether network load prediction is required; prediction start means for starting network load prediction in response to a determination that the network load prediction is required; second determination means for determining, after the network load prediction is started, whether scale-out is required based on a network load prediction result; and scale-out execution means for executing scale-out of an element included in the communication system in response to a determination that the scale-out is required.

[2] The scale-out execution system according to Item [1], further including third determination means for determining whether scale-out is required based on the performance index value data without relying on the network load prediction result, and wherein the scale-out execution means is configured to execute the scale-out of the element included in the communication system in response to a determination by the second determination means or the third determination means that the scale-out is required.

[3] The scale-out execution system according to Item [2], wherein the first determination means is configured to determine that the network load prediction is required when a value indicating a level of a network load indicated by the performance index value data exceeds a first threshold value, and the third determination means is configured to determine that the scale-out is required when the value indicating the level of the network load indicated by the performance index value data exceeds a second threshold value larger than the first threshold value.

[4] The scale-out execution system according to Item [3], wherein the determination criterion determination means is configured to determine the first threshold value based on the usage amount of computer resources.

[5] The scale-out execution system according to any one of Items [2] to [4], wherein, in response to the performance index value data being enqueued in a queue in which the performance index value data is to be stored, the third determination means is configured to determine whether the scale-out is required based on the enqueued performance index value data, and the second determination means is configured to determine whether the scale-out is required based on a network load prediction result which is based on, of the performance index value data stored in the queue, a predetermined number of most recent pieces of the performance index value data or the performance index value data of a most recent predetermined period including at least the enqueued performance index value data.

[6] The scale-out execution system according to any one of Items [1] to [5], further including execution determination means for determining whether to execute a determination of whether network load prediction based on the usage amount of computer resources is required in accordance with an importance level of the element to be scaled out.

[7] The scale-out execution system according to any one of Items [1] to [6], further including prediction ending means for ending the network load prediction in response to satisfaction of a predetermined condition.

[8] A scale-out execution method including: acquiring performance index value data indicating an actual result value of a performance index value relating to a communication system; determining, based on a usage amount of computer resources, a determination criterion relating to whether network load prediction is required; determining, based on the performance index value data and the determination criterion, whether network load prediction is required; starting network load prediction in response to a determination that the network load prediction is required; determining, after the network load prediction is started, whether scale-out is required based on a network load prediction result; and executing scale-out of an element included in the communication system in response to a determination that the scale-out is required.

The invention claimed is:

1. A scale-out execution system, comprising one or more processors, the scale-out execution system being configured to cause at least one of the one or more processors to execute:
  a performance index value data acquisition process for acquiring performance index value data indicating an actual result value of a performance index value relating to a communication system;
  a determination criterion determination process for determining, based on a usage amount of computer resources, a determination criterion relating to whether network load prediction is required;
  a first determination process for determining, based on the performance index value data and the determination criterion, whether network load prediction is required;
  a prediction start process for starting network load prediction in response to a determination that the network load prediction is required;
  a second determination process for determining, after the network load prediction is started, whether scale-out is required based on a network load prediction result; and
  a scale-out execution process for executing scale-out of an element included in the communication system in response to a determination that the scale-out is required.

2. The scale-out execution system according to claim 1,
  wherein the scale-out execution system is configured to cause the at least one of the one or more processors to execute a third determination process for determining whether scale-out is required based on the performance index value data without relying on the network load prediction result, and
  wherein, in the scale-out execution process, the scale-out of the element included in the communication system is executed in response to a determination in the second determination process or the third determination process that the scale-out is required.

3. The scale-out execution system according to claim 2,
  wherein, in the first determination process, it is determined that the network load prediction is required when a value indicating a level of a network load indicated by the performance index value data exceeds a first threshold value, and
  wherein, in the third determination process, it is determined that the scale-out is required when the value indicating the level of the network load indicated by the performance index value data exceeds a second threshold value larger than the first threshold value.

4. The scale-out execution system according to claim 3, wherein, in the determination criterion determination process, the first threshold value is determined based on the usage amount of computer resources.

5. The scale-out execution system according to claim 2, wherein, in response to the performance index value data being enqueued in a queue in which the performance index value data is to be stored, in the third determination process, whether the scale-out is required is determined based on the enqueued performance index value data, and, in the second determination process, whether the scale-out is required is determined based on a network load prediction result which is based on, of the performance index value data stored in the queue, a predetermined number of most recent pieces of the performance index value data or the performance index value data of a most recent predetermined period including at least the enqueued performance index value data.

6. The scale-out execution system according to claim 1, wherein the scale-out execution system is configured to cause the at least one of the one or more processors to execute an execution determination process for determining whether to execute a determination of whether network load prediction based on the usage amount of computer resources is required in accordance with an importance level of the element to be scaled out.

7. The scale-out execution system according to claim 1, wherein the scale-out execution system is configured to cause the at least one of the one or more processors to execute a prediction ending process for ending the network load prediction in response to satisfaction of a predetermined condition.

8. A scale-out execution method, comprising:
acquiring performance index value data indicating an actual result value of a performance index value relating to a communication system;
determining, based on a usage amount of computer resources, a determination criterion relating to whether network load prediction is required;
determining, based on the performance index value data and the determination criterion, whether network load prediction is required;
starting network prediction in response to a determination that the network load prediction is required;
determining, after the network load prediction is started, whether scale-out is required based on a network load prediction result; and
executing scale-out of an element included in the communication system in response to a determination that the scale-out is required.

* * * * *